United States Patent [19]
Birbara et al.

[11] Patent Number: 5,876,488
[45] Date of Patent: Mar. 2, 1999

[54] REGENERABLE SOLID AMINE SORBENT

[75] Inventors: Philip J. Birbara, Windsor Locks; Thomas P. Filburn, Granby; Timothy A. Nalette, Tolland, all of Conn.

[73] Assignee: United Technologies Corporation, Hartford, Conn.

[21] Appl. No.: 734,904

[22] Filed: Oct. 22, 1996

[51] Int. Cl.⁶ .................................................. B01D 53/04
[52] U.S. Cl. ................................ 96/111; 96/115; 96/130; 95/139; 422/178; 422/196
[58] Field of Search .............................. 95/139, 117, 121, 95/122; 96/109, 111, 115, 130; 422/171, 177, 178, 196; 423/228–230

[56] References Cited

U.S. PATENT DOCUMENTS

| | | | |
|---|---|---|---|
| 2,545,194 | 3/1951 | Colburn et al. | 95/139 |
| 3,491,031 | 1/1970 | Stoneburner | 423/230 X |
| 4,005,708 | 2/1977 | Netteland et al. | 423/230 X |
| 4,810,266 | 3/1989 | Zinnen et al. | 95/139 |
| 4,822,383 | 4/1989 | Brose et al. | 95/139 X |
| 4,999,175 | 3/1991 | Vansant et al. | 423/244 |
| 5,281,254 | 1/1994 | Birbara et al. | 95/44 |
| 5,376,614 | 12/1994 | Birbara et al. | 423/230 X |

FOREIGN PATENT DOCUMENTS

| | | | |
|---|---|---|---|
| 2040314 | 2/1971 | Germany . | |
| 61-227820 | 10/1986 | Japan . | |
| 62-041709 | 2/1987 | Japan | 95/139 |
| 62-105912 | 5/1987 | Japan | 95/139 |
| 01-208310 | 8/1989 | Japan | 95/139 |
| 01-236915 | 9/1989 | Japan | 95/139 |
| 4-200742 | 7/1992 | Japan | 423/230 |
| 05 161843 | 6/1993 | Japan . | |
| 662338A1 | 12/1995 | Netherlands . | |
| 0762943 | 9/1980 | U.S.S.R. | 423/230 |
| 9413386 | 6/1994 | WIPO . | |

Primary Examiner—Robert Spitzer
Attorney, Agent, or Firm—McCormick, Paulding & Huber

[57] ABSTRACT

The invention provides a regenerable supported amine sorbent having an amine concentration of from about 35 wt. % to about 75 wt. %. The balance of the sorbent is a porous support which provides the sorbent with structural rigidity and a surface for gas/solid contact. The invention further provides a process for making the sorbent and system for cyclically absorbing and desorbing carbon dioxide using a plurality of sorbent beds.

18 Claims, 3 Drawing Sheets

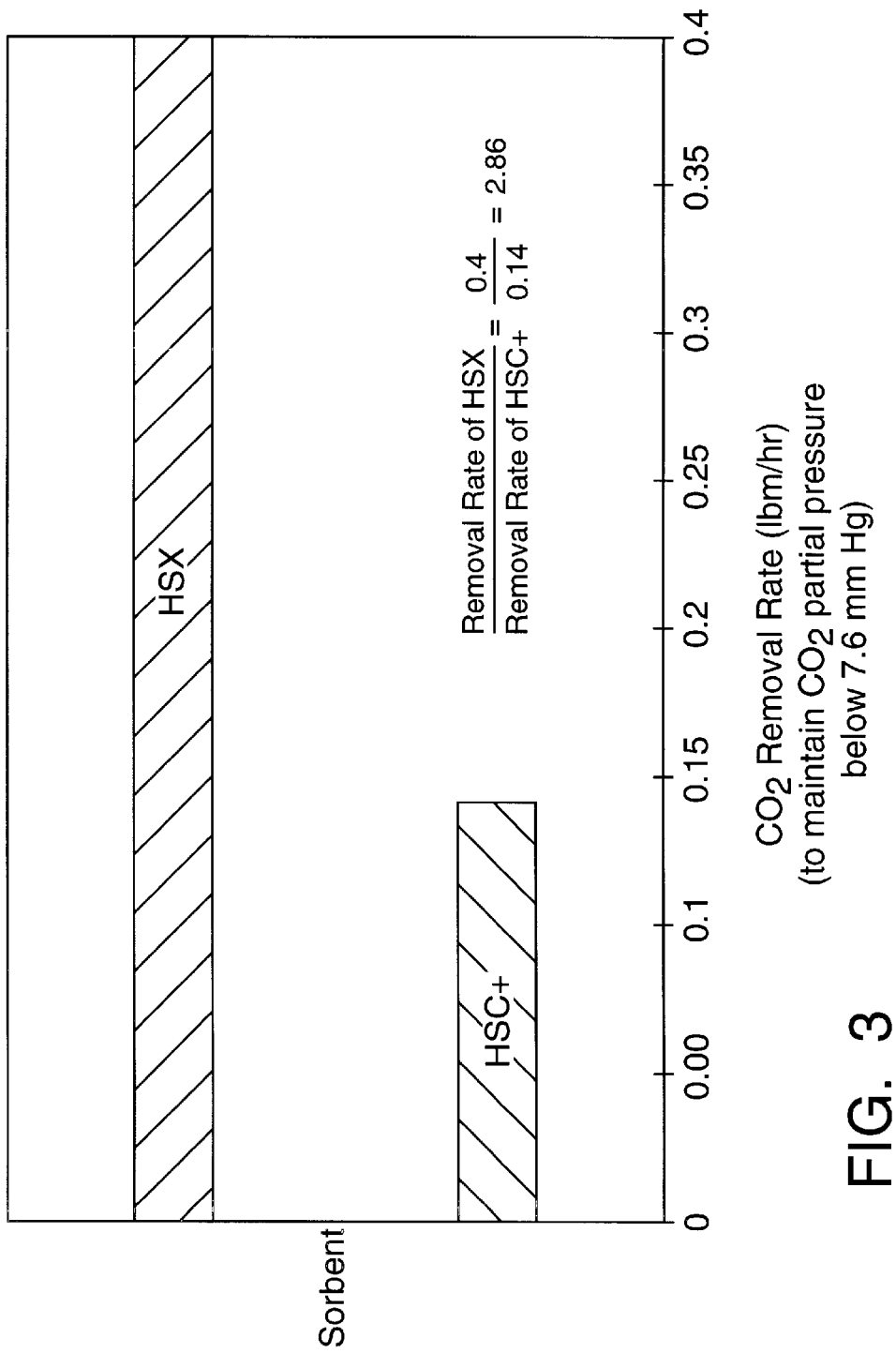

REGENERABLE SOLID AMINE SORBENT

FIELD OF THE INVENTION

The present invention relates generally to a sorbent for absorbing carbon dioxide. More particularly, the invention relates to a regenerable solid amine sorbent for adsorbing carbon dioxide.

BACKGROUND OF THE INVENTION

Exposure to carbon dioxide partial pressures exceeding about 7.6 mm Hg (millimeters of mercury, partial pressure of about 1%), for extended periods of time are known to cause health problems in humans and other mammals. As a result, in enclosed habitable environments such as those existing in a submarine, space craft or space suit, carbon dioxide partial pressures are typically maintained below about 1% via the use of solid regenerable and nonregenerable carbon dioxide sorbents such as soda lime, zeolite and carbon molecular sieves, solid oxides, alkali metal carbonates, alkali metal hydroxides, amines, and combinations thereof, among others.

In addition to these sorbents, amines such as monoethanolamine and diethanotamine are often used in a liquid phase to reduce carbon dioxide partial pressures via absorption. These amines are utilized in the aqueous phase, typically 25 wt. % (weight percent) to 30 wt. % amine. The amine solution enters the top of an absorption tower while the carbon dioxide containing gaseous stream is introduced into the bottom of the tower. While intimately contacting the gaseous stream in a counter-current fashion, the amine solution chemically reacts with the carbon dioxide to absorb and remove the carbon dioxide from the gaseous stream. Desorption of the absorbed carbon dioxide then proceeds via a thermal regeneration process at temperatures in excess of about 150° F. (about 66° C.). During desorption, carbon dioxide and water evolve from the amine solution and are separated by condensing the water vapor in a heat exchanger. Once regenerated, the amine solution is recycled back to the absorption tower for additional carbon dioxide absorption.

Although amine solutions are capable of initially removing carbon dioxide to partial pressures below about 1%, they have a limited life due to degradation through oxidation of the amine. Oxygen present in the gas stream oxidizes the amine particularly at the elevated temperatures during desorption when the amine solution is heated. This oxidation is believed to reduce the amount of amine primary and secondary functional groups available for carbon dioxide absorption. Consequently, the amine solution's useful life is limited to only about six months of continuous use.

In contrast, if desorption is accomplished at ambient temperatures, the useful life of the amine solution will be extended; however, performance will be limited by low desorption rates. Due to both energy requirements and oxidation related degradation, amine sorbents utilized in closed environment systems are often regenerated at approximately ambient temperatures for a fixed desorption time. At ambient temperatures, the desorption of carbon dioxide is often limiting. Under these conditions, the desorption process will typically have insufficient time to fully desorb the absorbed carbon dioxide. Consequently, a portion of the absorbed carbon dioxide remains in the sorbent after the desorption process is complete, thereby reducing the capacity of the sorbent to absorb additional carbon dioxide. As a result, a decreasing portion of the carbon dioxide sorbent is used throughout the absorption-desorption cyclical process.

Commonly assigned U.S. Pat. No. 5,376,614 discloses a solid aminepolyol sorbent comprising about 1 wt. % to about 25 wt. % amine, about 1 wt. % to about 25 wt. % polyol, and the remainder being a porous support which provides the amine with structural integrity and a high surface area for gas/solid contact. While the solid amine sorbent disclosed in this reference provides a number of advantages over the previously described solid and liquid sorbents, increased concentration of amine in the sorbent and improvements in cyclic $CO_2$ removal capacity are desirable. In addition, formation of the sorbent is a fairly complex process requiring either pre-forming an amine/polyol solution and then impregnating the support with this solution, or impregnating the support with an amine solution followed by a second impregnation of the support with a polyol solution.

It is therefore an object of the invention to provide a solid regenerable carbon dioxide sorbent having an increased amine concentration.

It is a further object of the invention to provide such a sorbent having high carbon dioxide removal rates and high desorption rates at ambient temperatures.

It is a still further object of the invention to provide a process for forming such a sorbent.

It is yet another object of the invention to provide a continuous use, cyclic absorption/desorption system using such a sorbent that is not influenced by the presence of humidity by using such a sorbent.

SUMMARY OF THE INVENTION

The present invention provides a supported regenerable amine sorbent comprising from about 35 wt. % to about 75 wt. % amine, and a porous support which provides the amine with structural integrity and a high surface area for gas/solid contact. The sorbent is utilized to absorb carbon dioxide and water vapor (if present) from a gaseous stream. In contrast to prior art sorbents, the performance of the sorbent taught by the present invention is capable of achieving elevated carbon dioxide cyclical removal capacities in either a dry or humid air flow challenge.

The present invention further relates to a method for forming such a sorbent. The method includes the steps of forming an amine/solvent solution, mixing a porous support material with the solution, and heating the mixture to both retain the amine on the support material and remove the solvent, thereby forming the supported amine sorbent.

The present invention additionally relates to a system utilizing two or more sorbent beds operating cyclically such that the first bed is in the absorption cycle while the second bed is in the desorption cycle. The exothermic heat of absorption from the first bed is utilized in desorption of the second bed. A means for applying a gradient in the partial pressure of carbon dioxide is also utilized in desorption of the second bed. The absorption and desorption cycling of the beds permits continuous absorption of carbon dioxide and water vapor (if present) from a gaseous stream containing these gases.

The foregoing and other features and advantages of the present invention will become more apparent from the following description and accompanying drawings.

BRIEF DESCRIPTION OF THE DRAWINGS

FIG. 3 is a graph illustrating the cyclic performance capacities of the sorbents compared in FIG. 2.

BEST MODE FOR CARRYING OUT THE INVENTION

Figure 1:
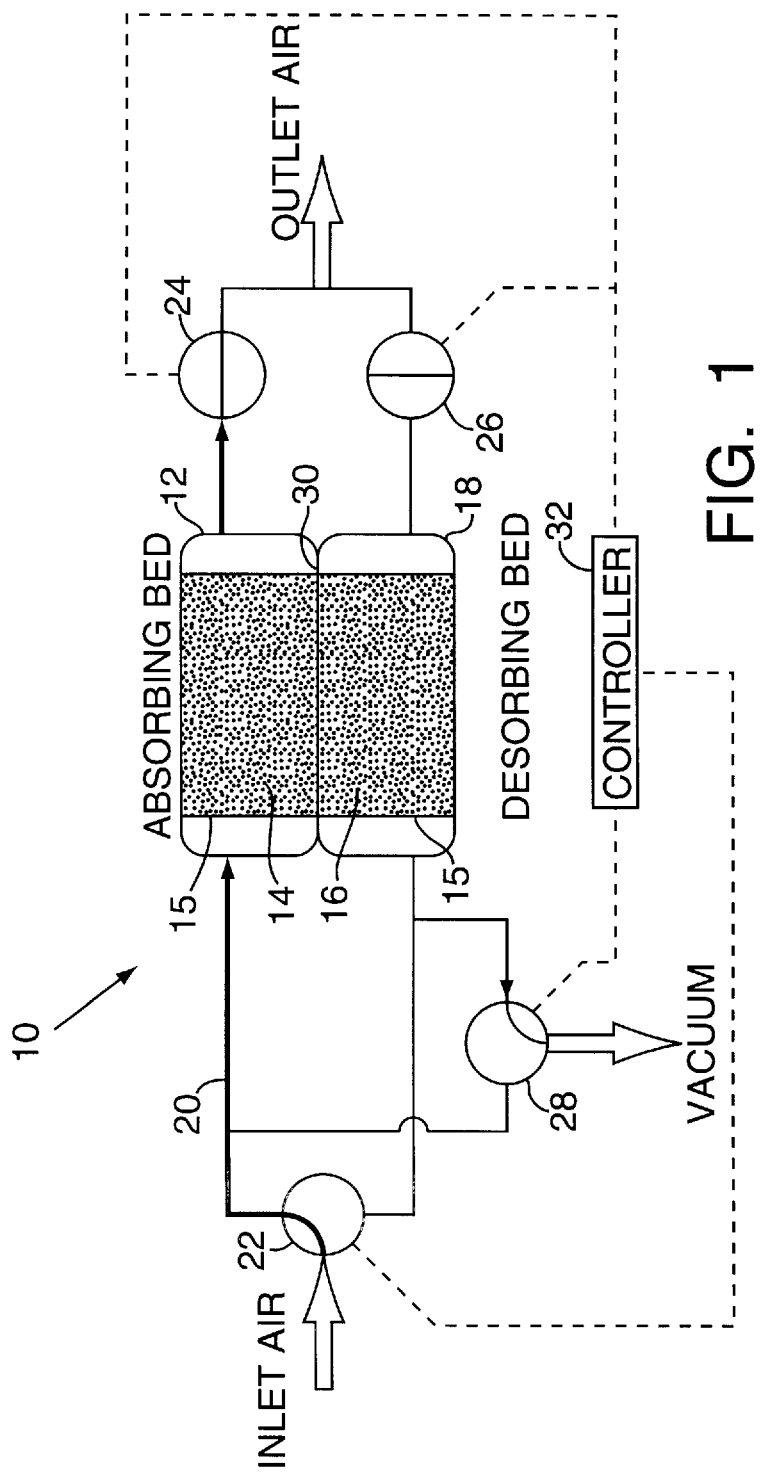
FIG. 1 is a schematic representation of an adsorbent/desorbent system utilizing the present invention.

The present invention provides a regenerable supported amine sorbent comprising from about 35 wt. % to about 75 wt. %, preferably from about 45 wt. %. to about 65 wt. %, amine. The balance of the sorbent is a porous support which provides the amine with structural integrity and a high surface area for gas/solid contact.

The amine is preferably a secondary amine, although mixtures of a secondary amine together with primary and/or tertiary amines can be utilized. Secondary amines including a plurality of hydroxyl (—OH) groups have been found to be particularly useful in practicing the invention. Additional preferred characteristics of the polymer include low volatility, nontoxicity, and the ability to absorb carbon dioxide from relatively low partial pressures of less than 7.6 mm Hg down to negligible levels (typically below about 1 mm Hg or lower). Generally, the amine's partial pressure is below about 0.05 mm Hg, with below about 0.01 mm Hg at 20° C. preferred, since minimizing the amine's partial pressure minimizes the loss of amine during the absorption/desorption process due to volatilization.

Particular amines suitable for forming the sorbent include diethanolamine (DEA), diisopropanolamine (DIPA), and 2-hydoxyethyl piperazine (HEP). Suitable amines posses secondary and /or primary amines together with alcohol (OH) functionality. The preferred amine is DEA.

Supports which are useful in practicing the invention are high surface area porous supports having a surface area of about 50 $m^2/g$ to about 1,000 $m^2/g$, with a surface area greater than about 300 $m^2/g$ being preferred. The supports are also preferably polar in nature. Possible supports include alumina, zeolite, carbon molecular sieves, ion exchange resins, and polymeric absorbent resins such as acrylic ester polymers, polystyrene divinyl benzene and mixtures thereof.

Preferably, the support is formed from an acrylic ester polymer having a macroreticulate structure. A particularly suitable acrylic ester polymer is available from Rohm and Haas, Philadelphia, Pa. under the trademark AMBERLITE®. This polymer has a surface area of from about 400 $m^2/g$ to about 500 $m^2/g$, a pore size of about 80Å and a porosity of about 50%. A support formed from AMBERLITE® also possesses surface characteristics which promote adhesion of the amine to the support for chemical bonding.

To form the sorbent, the amine is solubilized with an alcohol in an aqueous or alcohol-based non-reactive solvent. Soluble alcohol based solvents which may contain water including methanol, ethanol, isopropyl alcohol, and mixtures thereof are preferred. Methanol containing less than 10 wt. % water has been found to be a preferred solvent.

Once the amine solution is formed, the support material, typically in the form of pellets or beads, is mixed with the solution and the mixture is heated. This can be accomplished by, for example, adding the support material to the amine solution in a rotating flask immersed in a water bath. The mixture is heated to a temperature in the range of from about 70° C. to about 100° C., and preferably from about 90° C. to about 95° C. The application of elevated temperatures to the amine/support mixture aids in the bonding and dispersal of the amine on the support and provides a sorbent having a higher concentration of amine than has previously been achieved.

Heating the mixture also aids in removing the solvent from the mixture and, accordingly, from the final product. To further insure that the solvent is almost completely removed for the formed sorbent, the mixture is also subjected to a vacuum to facilitate the evaporation of the solvent. It should be understood that although complete solvent removal from the sorbent is not required, it is preferred in the above mentioned formation technique that substantially all of the solvent be removed from the sorbent. Insufficient solvent removal can cause contamination of the habitable environment with solvent vapor since the solvent is highly volatile.

EXAMPLE I

The following process was employed to form a supported amine sorbent comprising 53 wt. % diethanolamine and 47 wt. % AMBERLITE® XAD-7:

1. 150 grams of as received AMBERLITE® sorbent support was contacted with 400 ml of methyl alcohol within a 2,000 ml round bottom flask. This mixture is stirred for about 10 minutes.
2. The excess methanol from the previous step is decanted. About 300 ml of methanol is added to the wetted support and the mixture for about 10 minutes.
3. The excess methanol is again decanted and the wetted beads are thoroughly dried within a rotating vacuum flask evaporator which is partially submerged in a water bath maintained at 90° C.
4. An AMBERLITE® support coating solution is prepared by adding 112 grams of diethanolamine and 10 grams of distilled water to 250 cc of methanol.
5. The above prepared solution is added to 100 grams of the dried AMBERLITE® support. This mixture is stirred within a rotating flask at about 50° C. for about 15 minutes.
6. The mixture is dried within the constant temperature water bath maintained at 50° C. within the rotating flash evaporator at vacuum until the bulk of the methanol is removed.
7. The temperature of the bath is then raised to 95° C. while maintaining a vacuum within the rotating flash evaporator. The elevated temperature facilitates the removal of methanol and water from the coated support while contributing to the bonding of the diethanolamine coating to the AMBERLITE® support.

After the sorbent has been formed and the solvent has been removed, the sorbent is typically employed in a sorbent bed where a gaseous stream containing carbon dioxide, and possibly water vapor chemically react with the amine to form an amine complex, thereby removing the carbon dioxide and the water from the gaseous stream. Once the amine is saturated, i.e. greater than about 80% of the amine has been converted to the amine complex, or at a designated cycle time, the sorbent bed is regenerated. Regeneration comprises ceasing the flow of the carbon dioxide containing gas stream through the bed and desorbing the absorbed carbon dioxide and water. The endothermic desorption reaction is accomplished by thermal and/or $CO_2$ partial pressure gradient means.

Desorption comprises heating the bed to a temperature of from about 30° C. to about 50° C. and/or reducing the carbon dioxide partial pressure to below about 0.1 mm Hg by applying a vacuum and/or employing a carbon dioxide lean sweep gas, such as nitrogen, to remove the desorbed carbon dioxide and water. These temperature and carbon dioxide partial pressure gradients drive the reaction between the carbon dioxide, water, and amine in the reverse direction, thereby regenerating the amine and releasing the absorbed carbon dioxide and water. If the sorbent is heated, it is preferred to heat it in a low oxygen partial pressure environment to further reduce possible oxidation of the amine.

Use of the sorbent to absorb carbon dioxide and water can comprise employing two or more beds operating cyclically such that the first bed is in the absorption cycle while the second bed is in the desorption cycle. This allows for continuous carbon dioxide and water removal from the gaseous stream.

For example, the sorbent of the present invention can be placed in a dual bed heat exchanger, such as the segmented and thermally connected dual bed heat exchanger 10 illustrated in FIG. 1. In the first bed 12 of the heat exchanger, a first portion 14 of the sorbent dispersed within the pores of a metal foam 15 is in the absorption cycle. In a second bed 18, the remainder 16 of the sorbent, also dispersed within the metal foam 15, is in the desorption cycle.

The foam is typically formed from aluminum and comprises about 5–10% of the bed volume. A suitable foam is available from ERG, Oakland, Calif. under the trade designation DUOCELL®. The solid amine sorbent is lodged within the pores of the metal foam and is thus dispensed throughout beds 12 and 18.

In the absorption cycle, a stream 20 of inlet air containing carbon dioxide and water vapor (if present) is provided to bed 12 though two-way valve 22. As the air stream containing carbon dioxide flows through the sorbent 14 in bed 12, an exothermic reaction occurs between the carbon dioxide and the amine, thereby forming the amine complex and removing the carbon dioxide from the air stream. The amine will also act to adsorb water vapor if it is present in the gas stream. Outlet air from which the carbon dioxide and water vapor has been removed exits to the habitable environment through valve 24.

As noted above, the sorbent 16 in bed 18 is in the desorption cycle. The bed enters the desorption cycle once it has become saturated with carbon dioxide, or at a designated absorption time. In either case the sorbent 16 must be regenerated. This involves positioning valve 22 to stop the flow of inlet air to bed 18 and also closing valve 26 to prevent contaminated air from exiting the bed and entering the habitable environment. Carbon dioxide and water vapor (if present) are then desorbed from the bed 18 by thermal and/or reduced pressure means.

In the embodiment illustrated in FIG. 1 both means are used to regenerate the bed. The heat produced during absorption in bed 12 is transferred to the sorbent 16 in the second bed 18 to drive the endothermic desorption of the absorbed carbon dioxide and water. Heat transfer between the beds is provided by the metal foam 15 in each of the beds 12 and 18 and the common wall 30 between the beds. In addition, the sorbent 16 is exposed to a vacuum source, such as space vacuum, through valve 28. Exposure of the sorbent 16 to such a pressure gradient enhances the overall performance of the system 10 by facilitating the regeneration of the sorbent for subsequent carbon dioxide absorption.

After a predetermined time interval or at a specified carbon dioxide concentration, the absorption and desorption cycles are reversed, i.e., bed 12 enters the desorption cycle and bed 18 enters the absorption cycle. This is accomplished by reversing the valve settings shown in FIG. 1 and exposing the bed 12 to vacuum. The valves are automatically controlled by a controller 32 which is responsive to a sensor (not shown) which detects the level of $CO_2$ in the beds or to a pre-determined absorption time interval.

The two bed arrangement shown in FIG. 1 can be used, for example to remove the metabolically produced $CO_2$ of an astronaut operating in an Extra-vehicular Mobility Unit (EMU). In such an application, the absorbing bed receives the full ventilation flow of air from the EMU while the second bed is exposed to space vacuum. For a system using two beds of 0.05 ft$^3$ each, operating periods of between 4 and 20 minutes are appropriate.

Figure 2:
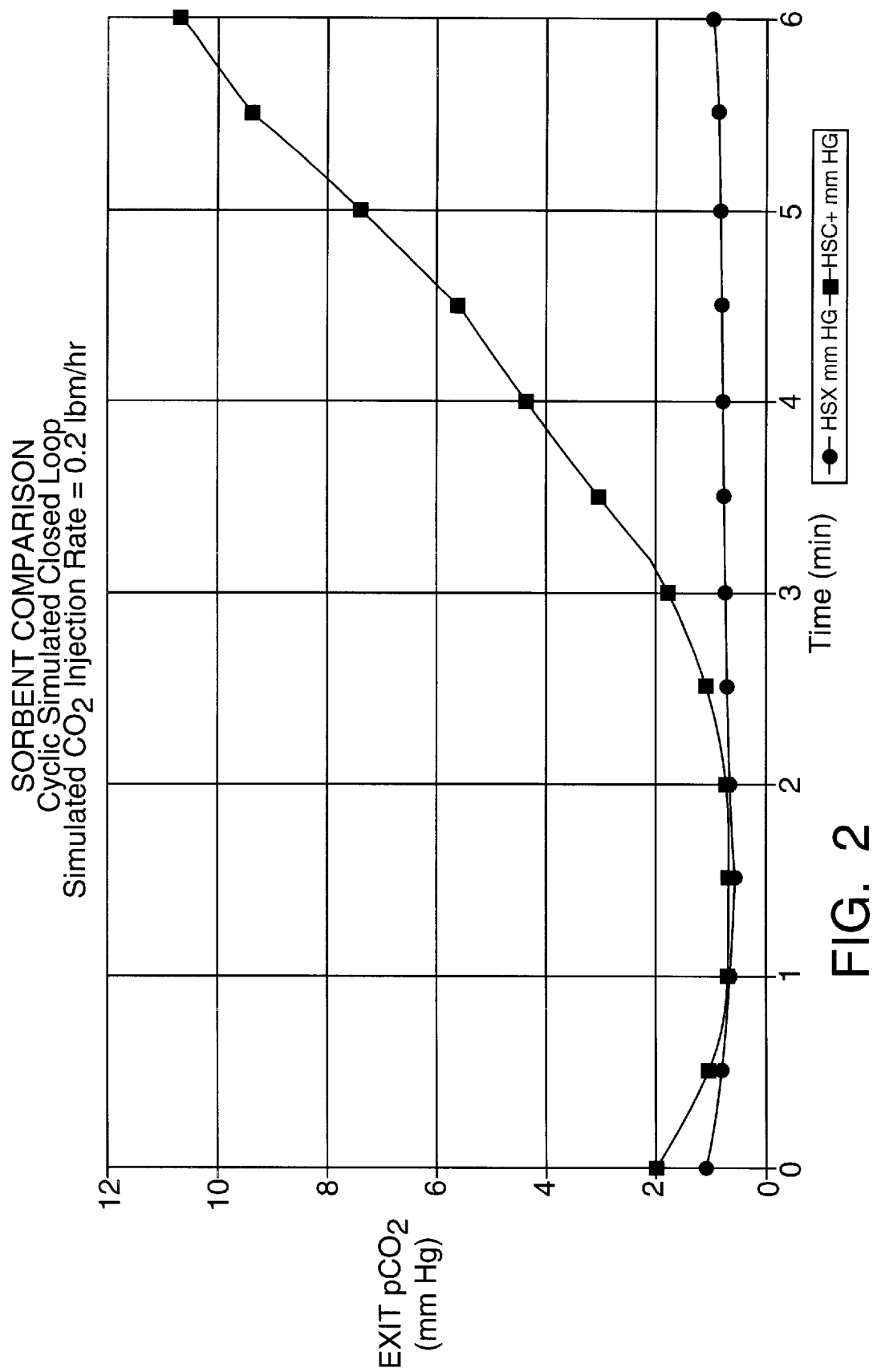
FIG. 2 is a graph illustrating the outlet $CO_2$ level of the supported amine sorbent of the present invention compared to the outlet $CO_2$ level of a prior art sorbent.

FIG. 2 is a comparison of the outlet $CO_2$ levels of the sorbent described in Example I (HSX) and of the amine/polyol sorbent disclosed in U.S. Pat. No. 5,376,614 (HSC+).

FIG. 3 shows the maximum equivalent metabolic rate that each sorbent is capable of removing with a fixed volume and cycle time. As illustrated by FIGS. 2 and 3, while the outlet $CO_2$ levels remain lower for the Example I sorbent, the sorbent of the present invention exhibits a large increase in $CO_2$ removal capacity. In connection with FIG. 3 it should be understood that the $CO_2$ generation rate, and therefore the $CO_2$ removal rate, is directly proportional to metabolic rate. For example, a metabolic rate of 2000 BTU/hr equals a $CO_2$ generation rate of 0.4 Ibm/hr for a full scale system.

The increase in cyclic $CO_2$ capacity per unit of bed volume for the Example I sorbent can be attributed in part to the increase in the sorbent's amine loading. Normalized equilibrium testing of the Example I sorbent shows greater than a four fold increase in total $CO_2$ capacity compared with the sorbent disclosed in the '614 patent.

We claim:

1. A system for cyclically absorbing and desorbing carbon dioxide and water vapor, said system comprising:

first and second sorbent beds, each bed containing a supported regenerable amine sorbent comprising from about 35 wt. % to about 75 wt. % amine, said amine selected from the group consisting of primary amines, secondary amines, and mixtures thereof including a plurality of hydoxyl (—OH) groups, and an acrylic ester resin porous support for providing structural integrity to the amine;

a plurality of valves for directing a gas stream into and out of each sorbent bed and for exposing each bed to a pressure gradient;

a thermal conductor for conducting heat between the beds;

a sensor for detecting the concentration of carbon dioxide in each bed; and a controller responsive to one of the sensor and a predetermined time period for controlling operation of the plurality of valves so that one of the beds is in the absorption cycle while the second bed is in the desorption cycle.

2. A supported regenerable amine sorbent comprising from about 35 wt. % to about 75 wt. % amine, said amine selected from the group consisting of primary amines, secondary amines, and mixtures thereof including a plurality of hydoxyl (—OH) groups, and an acrylic ester resin porous support for providing the amine with structural integrity and a surface for gas/solid contact.

3. The sorbent of claim 2, wherein the amine is selected from the group consisting of diethanolamine (DEA), diisopropanolamine (DIPA), 2-hydoxyethyl piperazine (HEP), and mixtures thereof.

4. The sorbent of claim 3, wherein the amine is diethanolamine.

5. The sorbent of claim 4, wherein the diethanolamine is present in a concentration of about 53 wt. %.

6. The sorbent of claim 2, wherein the amine is present in a concentration of from about 45 wt. % to about 65 wt. %.

7. The sorbent of claim 2, wherein the porous support has a surface area of from about 50 m$^2$/g to about 1,000 m$^2$/g.

8. A supported regenerable amine sorbent comprising from about 45 wt. % to about 65 wt. % amine selected from the group consisting of diethanolamine (DEA), diisopropanolamine (DIPA), 2-hydoxyethyl piperazine (HEP), and mixtures thereof, the remainder of the sorbent being a porous acrylic ester resin for providing structural integrity to the amine and a surface for gas/solid contact.

9. The sorbent of claim 8 comprising about 53 wt. % diethanolamine and about 47 wt. % acrylic ester resin.

10. A process for making a regenerable supported amine sorbent, said process comprising the steps of:

forming an amine/solvent solution, said amine selected from the group consisting of primary amines, secondary amines, and mixtures thereof including a plurality of hydoxyl (—OH) groups;

mixing an acrylic ester resin porous support material with the amine solution;

heating the mixture to both retain the amine on the support and remove the solvent from the mixture, and thereby form the sorbent.

11. The process of claim 10 further including the step of evaporating the solvent from the mixture.

12. The process of claim 10, wherein the amine is selected from the group consisting of diethanolamine (DEA), diisopropanolamine (DIPA), 2-hydoxyethyl piperazine (HEP), and mixtures thereof.

13. The process of claim 10, wherein the amine is diethanolamine.

14. The process of claim of claim 10, wherein the step of heating is further characterized in that the mixture is heat to a temperature in the range of from about 70° C. to about 100° C.

15. The process of claim 14, wherein the mixture is heated to a temperature in the range of from about 90° C. to about 95° C.

16. The process of claim 10, wherein the step of heating the mixture is further characterized in that the sorbent comprises from about 35 wt. % to about 75 wt. % amine.

17. The process of claim 10, wherein the step of forming the amine solution is further characterized in that the solvent is selected from the group consisting of alcohol-based solvents, non-reactive solvents, and aqueous solvents.

18. The process of claim 17, wherein the solvent is methanol.

* * * * *